(12) United States Patent
Asami et al.

(10) Patent No.: US 7,433,175 B2
(45) Date of Patent: Oct. 7, 2008

(54) SOLID ELECTROLYTIC CAPACITOR, DISTRIBUTED CONSTANT TYPE NOISE FILTER, AND METHOD OF PRODUCING THE SAME

(75) Inventors: Tadamasa Asami, Sendai (JP); Toshihisa Nagasawa, Sendai (JP); Akihiro Kawai, Sendai (JP); Yuichi Maruko, Sendai (JP); Yuji Aoki, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 245 days.

(21) Appl. No.: 11/496,820

(22) Filed: Aug. 1, 2006

(65) Prior Publication Data
US 2007/0030629 A1    Feb. 8, 2007

(30) Foreign Application Priority Data
Aug. 4, 2005    (JP)    ............................ 2005-226640

(51) Int. Cl.
*H01G 5/013*    (2006.01)
*H01G 4/06*    (2006.01)

(52) U.S. Cl. ...................... 361/524; 29/25.03

(58) Field of Classification Search .......... 361/523–524
See application file for complete search history.

(56) References Cited

U.S. PATENT DOCUMENTS

| 6,324,051 | B1 * | 11/2001 | Igaki et al. | 361/523 |
| 6,400,556 | B1 * | 6/2002 | Masuda et al. | 361/523 |
| 6,594,141 | B2 * | 7/2003 | Takada | 361/523 |
| 6,882,520 | B2 * | 4/2005 | Kamigawa et al. | 361/523 |
| 6,956,732 | B1 * | 10/2005 | Yano et al. | 361/524 |
| 6,982,865 | B2 * | 1/2006 | Kawata et al. | 361/525 |
| 6,985,353 | B2 * | 1/2006 | Hirota et al. | 361/528 |
| 7,126,812 | B2 * | 10/2006 | Hirata et al. | 361/524 |

FOREIGN PATENT DOCUMENTS

| JP | 3-95910 A | 4/1991 |
| JP | 9-260215 A | 10/1997 |
| JP | 10-74669 A | 3/1998 |
| JP | 2002-164760 A | 6/2002 |

* cited by examiner

*Primary Examiner*—Eric Thomas
(74) *Attorney, Agent, or Firm*—Frishauf, Holtz, Goodman & Chick, P.C.

(57) ABSTRACT

In a solid electrolytic capacitor, a second dielectric layer made of an oxide of valve action metal is formed on first side, second side, and third side surfaces of an anode portion of an anode member. Between the second dielectric layer and a conductive polymer layer of the cathode layer, an electrical insulating resin layer is formed.

20 Claims, 10 Drawing Sheets

SOLID ELECTROLYTIC CAPACITOR, DISTRIBUTED CONSTANT TYPE NOISE FILTER, AND METHOD OF PRODUCING THE SAME

This application claims priority to prior Japanese patent application JP 2005-226640, the disclosure of which is incorporated herein by reference.

BACKGROUND OF THE INVENTION

This invention relates to a solid electrolytic capacitor capable of reducing leak current, a distributed constant type noise filter capable of reducing leak current, and a method of producing the same. More particularly, the invention relates to reduction of leak current in these components.

Referring to FIG. 1, a conventional solid electrolytic capacitor is configured to have an inner element 300, a resin package 8 formed by molding and covering the inner element 300, and anode and cathode terminals 9 and 10 electrically connected to the inner element 300 and partially exposed from the resin package 8.

The inner element 300 of the solid electrolytic capacitor is depicted in detail in FIGS. 2A, 2B, and 2C. The inner element 300 has an anode member 4 made of valve action metal and provided with an anode portion 4a and an anode lead portion 4b adjacent to each other. The inner element 300 further has a first dielectric layer 1 made of an oxide of the valve action metal and formed on lower and upper surfaces of the anode portion 4a, a second dielectric layer 3 made of an oxide of the valve action metal and formed on left side and right side surfaces of the anode portion 4a (in FIG. 2B) and an end side surface of the anode portion 4a (in FIG. 2C), and a cathode layer formed on the first and the second dielectric layers 1 and 3.

The cathode layer is composed of a conductive polymer layer 5 formed on the first dielectric layer 1 and the second dielectric layer 3, a graphite layer 6 formed on the conductive polymer layer 5, and a silver paste layer 7 formed on the graphite layer 6.

Again referring to FIG. 1, the anode terminal 9 is connected to a lower surface of the anode lead portion 4b of the anode member 4. The cathode terminal 10 is connected to a lower surface of the silver paste layer 7 of the cathode layer.

Referring to FIGS. 2a to 2C, a manufacturing process of the inner element 300 of the solid electrolytic capacitor is explained below.

First, a metal foil made of valve action metal of a relatively large size is prepared.

Lower and upper surfaces of the metal foil are enlarged in area by etching. Further, on an outer surface in a predetermined region of the metal foil, a dielectric layer made of oxide of the valve action metal is formed by an anodizing process with voltage applied. The metal foil with the dielectric layer is cut into many pieces each of which has a portion with the dielectric layer formed thereon and the other portion without the dielectric layer. In subsequent manufacturing, each of the pieces may be used as the anode member 4 with the first dielectric layer 1 partially formed thereon. The anode member 4 has a rectangular shape and is constituted of the anode portion 4a with the first dielectric layer 1 and the anode lead portion 4b without the first dielectric layer 1. However, the left side, the right side, and the end side surfaces of the anode portion 4a corresponding to cut surfaces of the anode member 4 (the piece) are uncovered by the first dielectric layer 1 and exposed.

Next, the second dielectric layer 3 is formed on the left side, the right side, and the end side surfaces of the anode portion 4a of the anode member 4 by an anodizing process with voltage applied.

Then, the conductive polymer layer 5, the graphite layer 6, and the silver paste layer 7 are formed in this order as the cathode layer on the first dielectric layer 1 and the second dielectric layer 3.

An applying voltage used in the anodizing process for the second dielectric layer 3 is set lower than that for the first dielectric layer 1 in order to prevent the first dielectric layer 1 from breaking-down in electrical isolation. Therefore, the second dielectric layer 3 is made thinner than the first dielectric layer 1. This means that the second dielectric layer 3 is inferior in electrical isolation to the first dielectric layer 1. When voltage is applied to the solid electrolytic capacitor (the element 300) in practical use, large leak current tends to pass through the second dielectric layer 3.

Referring to FIG. 3 together with FIGS. 4A, 4B, and 4C, a conventional distributed constant type noise filter is configured to have an inner element 500, a resin package 8, and first and second anode terminals 9 and 11 and a cathode terminal 10.

The inner element 500 of the distributed constant type noise filter has an anode member 4 made of valve action metal and provided with a first anode lead portion 4b, an anode portion 4a, and a second anode lead portion 4c in this order, a first dielectric layer 1 made of an oxide of the valve action metal and formed on lower and upper surfaces of the anode portion 4a, a second dielectric layer 3 made of an oxide of the valve action metal and formed on left side and right side surfaces of the anode portion 4a (in FIG. 4B), and a cathode layer formed on the first and the second dielectric layers 1 and 3.

The cathode layer is composed of a conductive polymer layer 5, a graphite layer 6, and a silver paste layer 7.

As shown in FIG. 3, the first and the second anode terminals 9 and 11 are connected to upper surfaces of the first and the second node lead portions 4b and 4c of the anode member 4, respectively. The cathode terminal 10 is connected to a lower surface of the silver paste layer 7 of the cathode layer.

Referring to FIGS. 4A to 4C, a manufacturing process of the inner element 500 of the distributed constant type noise filter is explained below.

First, a metal foil made of valve action metal of a relatively large size is prepared.

Lower and upper surfaces of the metal foil have been enlarged in area by etching. Further, on an outer surface in a predetermined region of the metal foil, a dielectric layer made of oxide of the valve action metal is formed by an anodizing process with voltage applied. The metal foil with the dielectric layer is cut into many pieces each of which has an intermediate portion with the dielectric layer formed thereon and two end portions without the dielectric layer. In subsequent manufacturing, each of the pieces may be used as the anode member 4 with the first dielectric layer 1 partially formed thereon. The anode member 4 has a rectangular shape and is constituted of the anode portion 4a with the first dielectric layer 1 and the first and the second anode lead portion 4b and 4c without the first dielectric layer 1. However, the left side, the right side, and the end side surfaces of the anode portion 4a corresponding to cut surfaces of the anode member 4 (the piece) are uncovered by the first dielectric layer 1 and exposed.

Next, the second dielectric layer 3 is formed on the left side and the right side surfaces of the anode portion 4a of the anode member 4 by an anodizing process with voltage applied.

Then, the conductive polymer layer 5, the graphite layer 6, and the silver paste layer 7 are formed in this order as the cathode layer on the first dielectric layer 1 and the second dielectric layer 3. Thus, the inner element 500 shown in FIGS. 4A to 4C has been manufactured.

An applying voltage used in the anodizing process for the second dielectric layer 3 is set lower than the anodizing process for the first dielectric layer 1 in order to prevent the first dielectric layer 1 from breaking-down in electrical isolation. Therefore, a similar problem arises with the electrical isolation property of the second dielectric layer mentioned above in connection with the conventional solid electrolytic capacitor.

Another example of a distributed constant type noise filter having the conductive polymer layer as the solid electrolytic layer is disclosed in Japanese Patent laid-open (JP-A) No. 2002-164760.

Further, a solid electrolytic capacitor having a second dielectric layer is disclosed in Japanese Patent laid-open (JP-A) Nos. Heisei 9-260215 and Heisei 10-74669. The second dielectric layer is formed by anodizing process with voltage applied on a cut surface of an anode member with a first dielectric layer formed thereon by anodizing process with voltage applied.

Further, a method of manufacturing solid electrolytic capacitor is disclosed in Japanese Patent laid-open (JP-A) No. Heisei 3-95910. In the method, a mask layer made of electrical insulating resin is formed on a unprocessed part of anodizing process of an anode member with a dielectric layer formed thereon.

SUMMARY OF THE INVENTION

An object of this invention is to provide a solid electrolytic capacitor and a distributed constant type noise filter capable of reducing leak current, and a method of manufacturing the same.

According to this invention, there is provided a solid electrolytic capacitor comprising an anode member which is made of a valve action metal and which is provided with an anode portion and an anode lead portion, a first dielectric layer made of an oxide of the valve action metal and formed on lower and upper surfaces of the anode portion, a second dielectric layer made of an oxide of the valve action metal and formed on first side, second side, and third side surfaces of the anode portion, and a cathode layer formed over said first and said second dielectric layers. The solid electrolytic capacitor further comprises an electrical insulating resin layer formed between said second dielectric layer and said cathode layer.

According to this invention, there is further provided a distributed constant type noise filter comprising an anode member which is made of a valve action metal and which is provided with a first anode lead portion, an anode portion, and a second anode lead portion, a first dielectric layer made of an oxide of the valve action metal and formed on lower and upper surfaces of the anode portion, a second dielectric layer made of an oxide of the valve action metal and formed on first side and second side surfaces of the anode portion, and a cathode layer formed over said first and said second dielectric layers. The distributed constant type noise filter further comprises an electrical insulating resin layer formed between said second dielectric layer and said cathode layer.

According to this invention, there is still further provided a method of manufacturing a solid electrolytic capacitor, the method comprising the steps of preparing a metal foil made of a valve action metal, the metal foil having a dielectric layer made of an oxide of the valve action metal on lower and upper surface thereof, of cutting-into an anode member from the metal foil, the anode member being provided with an anode portion and an anode lead portion, the anode portion having a first dielectric layer served by the dielectric layer on lower and upper surface thereof and being exposed on first side, second side, and third side surfaces thereof corresponding to cut surfaces of the metal foil of forming a second dielectric layer made of an oxide of the valve action metal on the first side, the second side, and the third side surfaces of the anode portion, and of forming a cathode layer over the first and the second dielectric layers. The method further comprises a step of forming an electrical insulating resin layer between the second dielectric layer and the cathode layer.

According to this invention, there is further provided a method of manufacturing a distributed constant type noise filter, the method comprising the steps of preparing a metal foil made of a valve action metal, the metal foil having a dielectric layer made of an oxide of the valve action metal on lower and upper surface thereof, of cutting-into an anode member from the metal foil, the anode member being provided with a first anode lead portion, an anode portion, and a second anode lead portion, the anode portion having a first dielectric layer served by the dielectric layer on lower and upper surface thereof and being exposed on first side and second side surfaces thereof corresponding to cut surfaces of the metal foil, of forming a second dielectric layer made of an oxide of the valve action metal on the first side and the second side surfaces of the anode portion, and, of forming a cathode layer over the first and the second dielectric layers. The method further comprises a step of forming an electrical insulating resin layer between the second dielectric layer and the cathode layer.

In accordance with this invention, each of a solid electrolytic capacitor and a distributed constant type noise filter can reduce of leak current because an electrical insulating resin layer excellent in electrical isolation is laminated on a second dielectric layer formed on a cut surface of an anode portion of an anode member.

BRIEF DESCRIPTION OF THE DRAWINGS

A more complete understanding of the invention may be obtained from a consideration of the following description in conjunction with the drawings in which:

FIG. 6 is a sectional view of the solid electrolytic capacitor according to the first embodiment of this invention in which the inner element shown in FIGS. 5A to 5C is built-in;

FIG. 9 is a sectional view of the solid electrolytic capacitor according to the second embodiment of this invention in which the inner element shown in FIGS. 8A to 8C is built-in.

DESCRIPTION OF THE PREFERRED EMBODIMENT

First Embodiment

Figure 6:
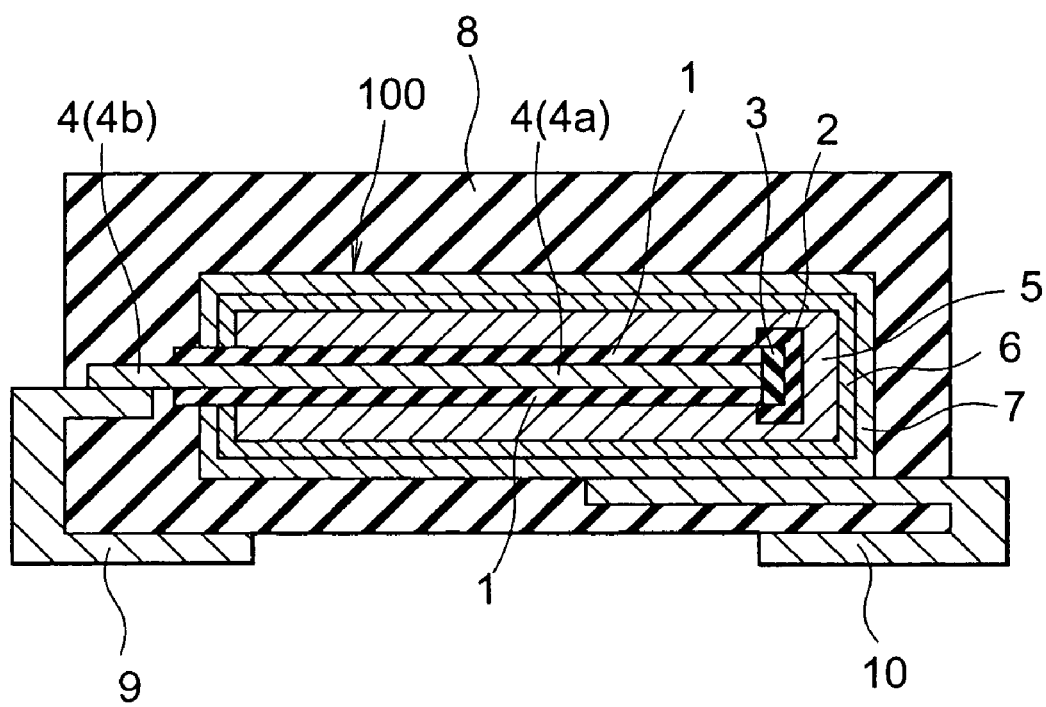

Referring to FIG. 6, a solid electrolytic capacitor according to a first embodiment of this invention has an inner element 100, a resin package 8 formed by molding and covering the inner element 100, an anode terminal 9, and a cathode terminal 10.

Figure 5A:
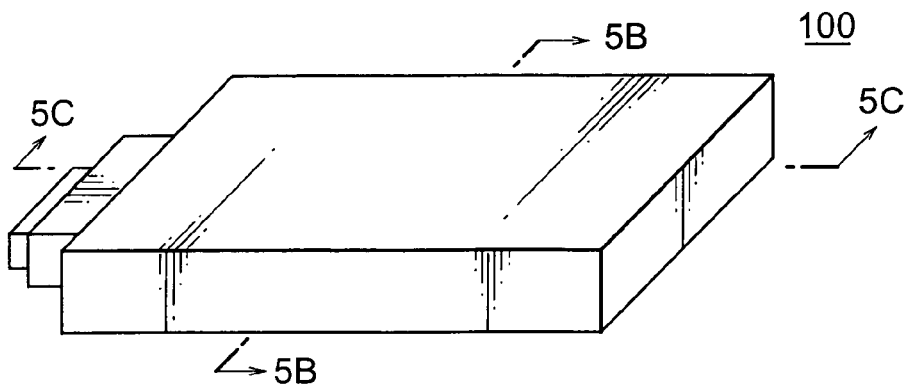
FIG. 5A is a perspective view showing an inner element of a solid electrolytic capacitor according to a first embodiment of this invention.
Figure 5B:
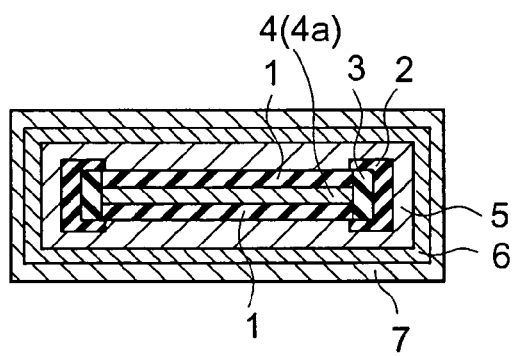
FIG. 5B is a sectional view taken along a line 5B-5B in FIG. 5A.
Figure 5C:
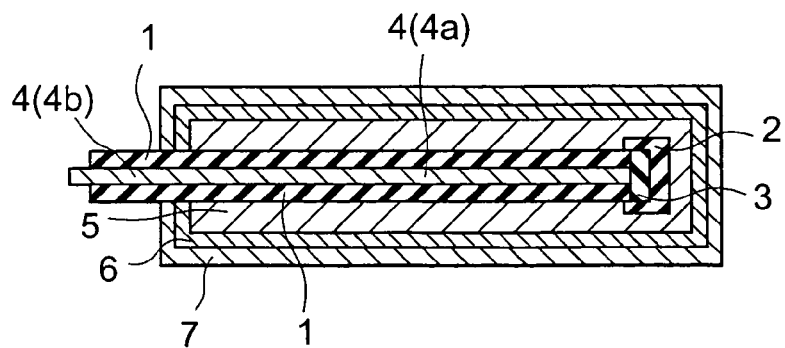
FIG. 5C is a sectional view taken along a line 5C-5C in FIG. 5A.

Referring to FIGS. 5A to 5C, the inner element 100 of the solid electrolytic capacitor has an anode member 4 made of aluminum that is the valve action metal. The anode member 4 is provided with an anode portion 4a and an anode lead portion 4b. The inner element 100 further has a first dielectric layer 1 made of the oxide of aluminum and formed on lower and upper surfaces of the anode portion 4a, a second dielectric layer 3 made of the oxide of aluminum and formed on left side, right side, and end side surfaces as first side, second side, and third side surfaces of the anode portion 4a, and a cathode layer formed over the first dielectric layer 1 and the second dielectric layer 3.

The left side and the right side surfaces of the anode portion 4a are opposed to each other and are perpendicular to the lower and the upper surfaces of the anode portion 4a. The end side surface is also perpendicular to the lower and the upper surfaces of the anode portion 4a and is positioned to make an angle, preferably at a right angle, with the left side and the right side surfaces.

The material of the anode member 4 is not limited to aluminum and may be valve action metal such as titanium, tantalum, and niobium, or alloys thereof. The first dielectric layer 1 and the second dielectric layer 3 may be the oxide of valve action metal.

The thickness of the first dielectric layer 1 is 7.8 nm while the thickness of the second dielectric layer 3 is 6.5 nm.

Furthermore, the inner element 100 has an electrical insulating resin layer 2 made of epoxy resin and formed between the second dielectric layer 3 and the cathode layer.

The electrical insulating resin layer 2 is not limited to the epoxy resin and can be electrical insulating resins such as phenol resin, silicon resin, fluorine resin, and polyimide resin. In particular, the epoxy resin is preferable because it is excellent in adhesion.

The thickness of the electrical insulating resin layer 2 is 15 μm. It is preferred that the thickness of the electrical insulating resin layer 2 is in the range of 2 to 30 μm. This is because layer defect may develop when the thickness is less than 2 μm while volumetric efficiency of the element is reduced when the thickness is more than 30 μm.

The cathode layer is composed of a conductive polymer layer 5 made of conductive polymer, such as polypyrrole and polyaniline, and formed on the first dielectric layer 1, and the electrical insulating resin layer 2, a graphite layer 6 formed on the conductive polymer layer 5, and a silver paste layer 7 formed on the graphite layer 6.

Next, a method of manufacturing the solid electrolytic capacitor according to the first embodiment of this invention will be described.

First, an aluminum foil of a relatively large size and made of aluminum is prepared.

Lower and upper surfaces of the metal foil are enlarged in area by etching. Further, on an outer surface in a predetermined region of the metal foil, a dielectric layer made of oxide of the valve action metal is formed by an anodizing process with an applied voltage of 6V. The metal foil with the dielectric layer is cut into many pieces each of which has a portion with the dielectric layer formed thereon and the other portion without the dielectric layer. In subsequent manufacturing, each of the pieces is used as the anode member 4 with the first dielectric layer 1 partially formed thereon. The anode member 4 has a rectangular shape and is constituted of the anode portion 4a with the first dielectric layer 1 and the anode lead portion 4b without the first dielectric layer 1. However, the first dielectric layer 1 is formed on lower and upper surfaces of the anode portion 4a only. On the other hand, the left side, the right side, and the end side surfaces of the anode portion 4a corresponding to cut surfaces of the anode member 4 (the piece) are uncovered by the first dielectric layer 1 and exposed.

Next, the second dielectric layer 3 is formed on the left side, the right side, and the end side surfaces of the anode portion 4a of the anode member 4 by an anodizing process with an applied voltage of 5V.

Subsequently, an electrical insulating resin layer 2 is formed on a surface of the second dielectric layer 3 by a coating process of epoxy resin with the use of a roll coater.

Then, the conductive polymer layer 5, the graphite layer 6, and the silver paste layer 7 are formed in this order as the cathode layer on the first dielectric layer 1 and the electrical insulating resin layer 2. The conductive polymer layer 5 is formed by a chemical polymerization process.

Thus, the inner element 100 shown in FIGS. 5A to 5C has been manufactured.

Referring again to FIG. 6, the anode terminal 9 is connected to a lower surface of the anode lead portion 4b of the anode member 4 and the cathode terminal 10 is connected to a lower surface of the silver paste layer 7 of the cathode layer.

The inner element 100 is covered with a resin package 8 by molding.

Thus, the solid electrolytic capacitor according to the first embodiment of this invention shown in FIG. 6 has been manufactured.

Meanwhile, forming process of the electrical insulating resin layer 2 is not limited to the coating process by the use of the roll coater and may be a coating process by the use of reverse coater, a print process such as screen printing, or a soaking process.

For comparison, solid electrolytic capacitors of first and second comparative examples have been fabricated and tested. The solid electrolytic capacitor of the first and the second comparative examples are described as follows.

First Comparative Example

Figure 1:
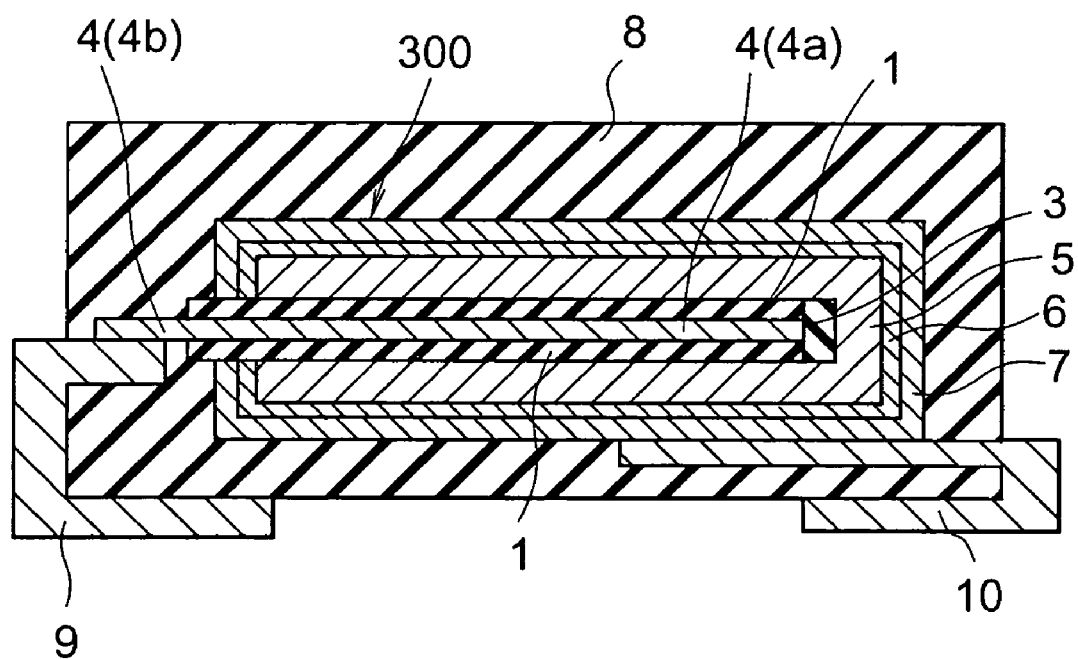
FIG. 1 is a sectional view showing a conventional solid electrolytic capacitor as a first comparative example.
Figure 2A:
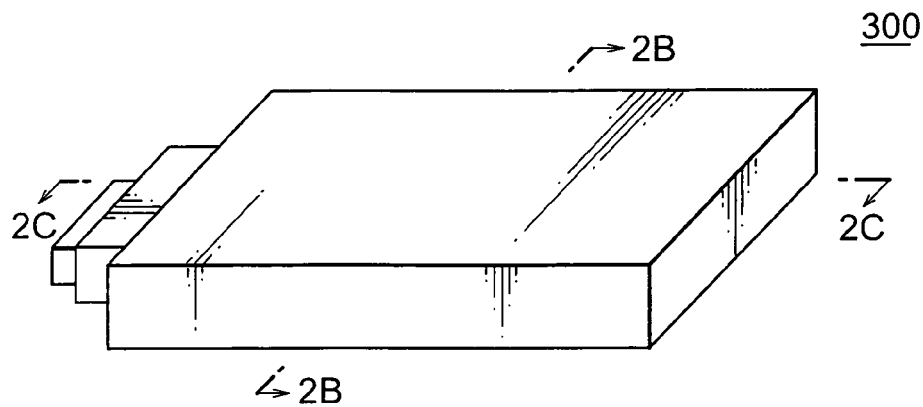
FIG. 2A is a perspective view of an inner element of the capacitor shown in FIG. 1.
Figure 2B:
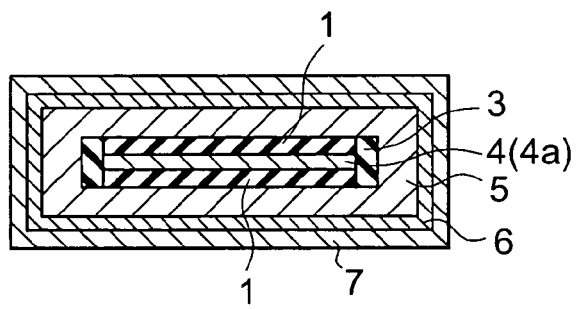
FIG. 2B is a sectional view taken along a line 2B-2B in FIG. 2A.
Figure 2C:
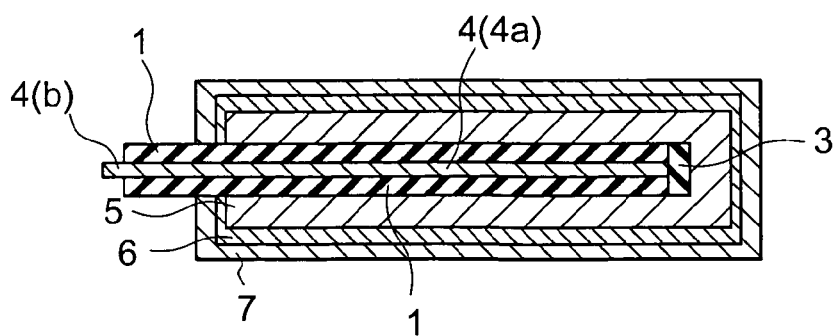
FIG. 2C is a sectional view taken along a line 2C-2C in FIG. 2A.

The conventional solid electrolytic capacitor shown in FIG. 1 is used as the first comparative example. The capacitor has the inner element 300 shown in FIGS. 2A to 2C, the resin package 8, and the anode and the cathode terminals 9 and 10. The inner element 300 has the anode member 4 made of aluminum as the valve action metal, the first dielectric layer 1 made of the oxide of aluminum, the second dielectric layer 3 made of the oxide of aluminum, and the cathode layer composed of the conductive polymer layer 5, the graphite layer 6, and the silver paste layer 7.

The thickness of the first dielectric layer 1 is 7.8 nm while the thickness of the second dielectric layer 3 is 6.5 nm.

In the solid electrolytic capacitor (the element 300) of the first comparative example, only the second dielectric layer 3 with a thickness of 6.5 nm is formed on the left side, the right side, and the end side surfaces of the anode portion 4a. The second dielectric layer 3 is formed by the anodizing process with an applied voltage of 5V.

Second Comparative Example

Figure 7A:
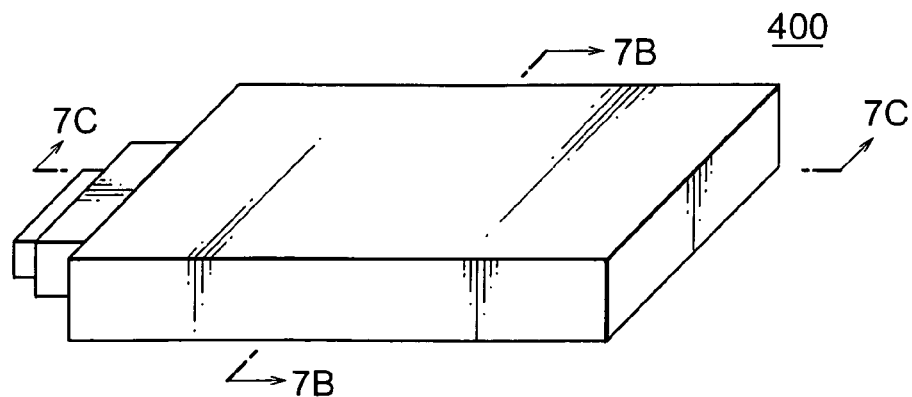
FIG. 7A is a perspective view showing an inner element of a solid electrolytic capacitor as a second comparative example.
Figure 7B:
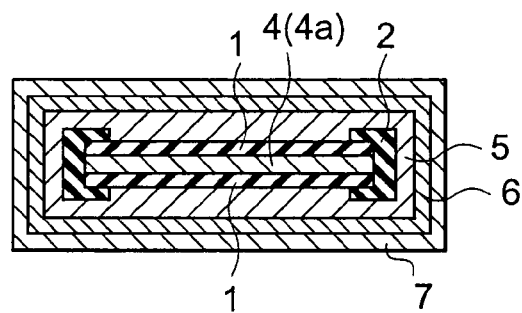
FIG. 7B is a sectional view taken along a line 7B-7B in FIG. 7A.
Figure 7C:
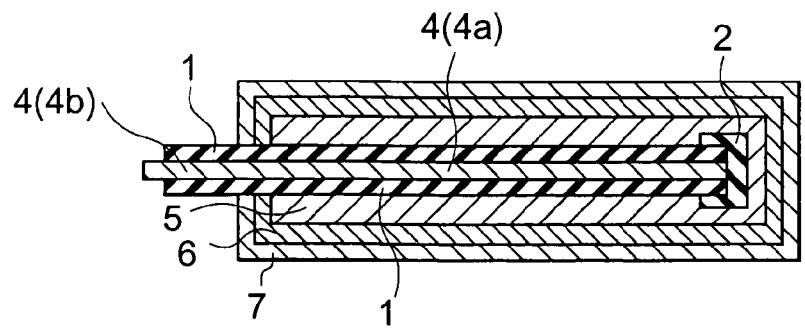
FIG. 7C is a sectional view taken along a line 7C-7C in FIG. 7A.

The solid electrolytic capacitor of the second comparative example has an inner element 400 shown in FIGS. 7A to 7C, a resin package, and an anode terminal, and a cathode terminal. Referring to FIGS. 7A to 7C, the inner element 400 has an anode member 4 made of aluminum as the valve action metal, a first dielectric layer 1 made of the oxide of aluminum, an electrical insulating resin layer 2 made of epoxy resin, and a cathode layer composed of a conductive polymer layer 5, a graphite layer 6, and a silver paste layer 7.

The thickness of the first dielectric layer 1 is 7.8 nm while the thickness of the electrical insulating resin layer 2 is 15 μm.

In the solid electrolytic capacitor (the element 400) of the second comparative example, only the electrical insulating resin layer 2 is formed on the left side, the right side, and the end side surfaces of the anode portion 4a.

Now, the solid electrolytic capacitors of the first embodiment and the first and the second comparative examples have been tested with leak current.

As test pieces, 100 pieces of the solid electrolytic capacitors in connection with the first embodiment and the first and the second comparative examples are prepared.

Test conditions are as follows. A voltage of 2.5 V is applied for 60 seconds between the anode terminal and the cathode terminal of each of the test pieces. A test piece is defined as defective when it shows a leak current of 15 μA or more.

As the test result, the distribution in leak current, the average leak current, and the defective rate in connection with each of the first embodiment and the first and the second comparative examples are shown in Table 1 below. In Table 1, the test result of distributed constant type noise filters of a second embodiment together with third and fourth comparative example mentioned hereinafter are also shown.

TABLE I

| | DISTRIBUTION IN LEAK CURRENT | AVERAGE LEAK CURRENT | DEFECTIVE RATE |
| --- | --- | --- | --- |
| 1st EMBODIMENT | 0.2 to 21 μA | 11 μA | 1% |
| 1st COMPARATIVE EXAMPLE | 0.8 to 224 μA | 103 μA | 8% |

TABLE I-continued

| | DISTRIBUTION IN LEAK CURRENT | AVERAGE LEAK CURRENT | DEFECTIVE RATE |
| --- | --- | --- | --- |
| 2nd COMPARATIVE EXAMPLE | 0.6 to 156 μA | 31 μA | 4% |
| 2nd EMBODIMENT | 0.2 to 18 μA | 10 μA | 1% |
| 3rd COMPARATIVE EXAMPLE | 0.2 to 259 μA | 127 μA | 11% |
| 4th COMPARATIVE EXAMPLE | 0.3 to 175 μA | 46 μA | 5% |

Referring to Table 1, it is clear that the first embodiment is improved in the defective rate compared to both of the first comparative example and the second comparative example. This result came from the fact that the first embodiment has the insulating resin layer on the second dielectric layer while the first comparative example has no electrical insulating resin layer and the second comparative example has no second dielectric layer. Meanwhile, the second comparative example is superior in the defective rate to the first comparative example although it is less improved compared with the first embodiment.

Second Embodiment

Figure 9:
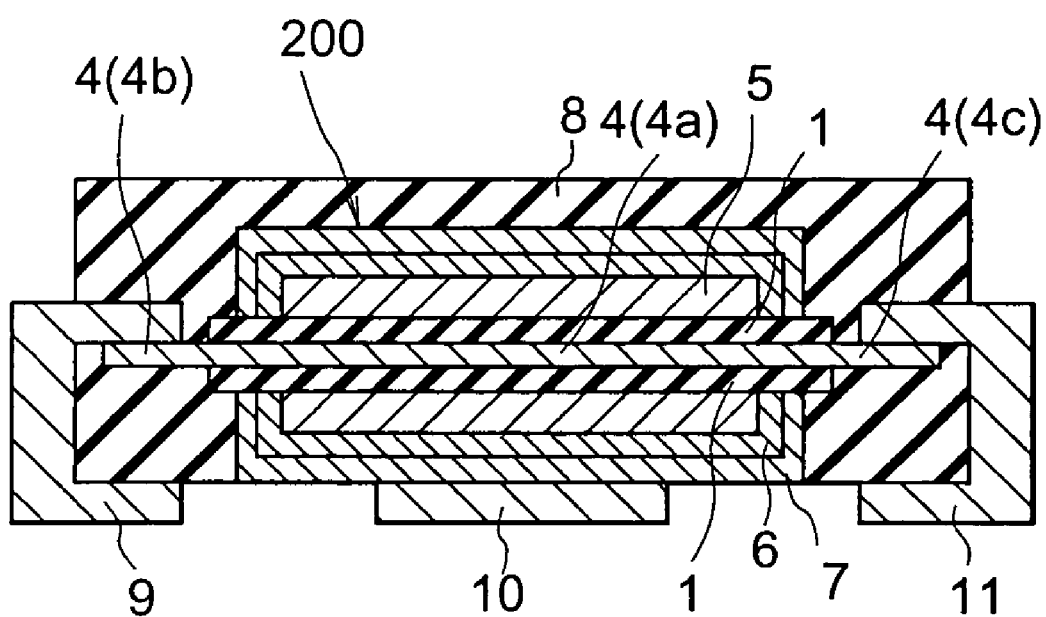

Referring to FIG. 9, a distributed type noise filter according to a second embodiment of this invention has an inner element 200, a resin package 8 formed by molding and covering the inner element 200, first and second anode terminals 9 and 11, and a cathode terminal 10.

Figure 8A:
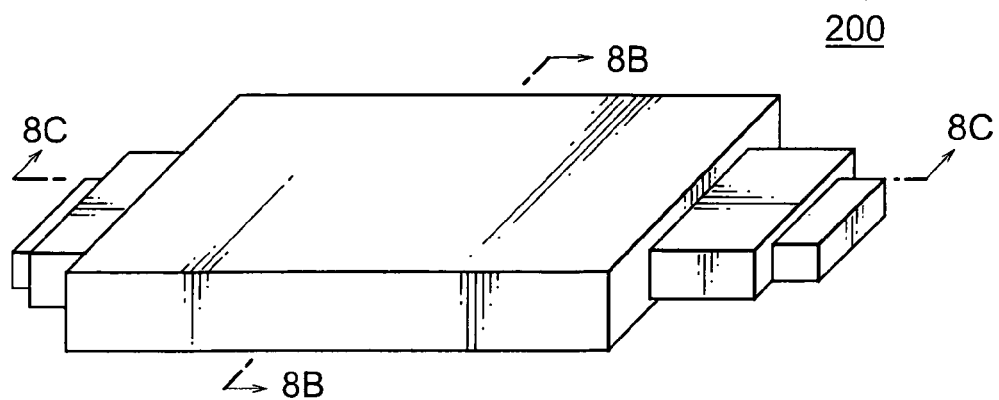
FIG. 8A is a perspective view showing an inner element of a distributed constant type noise filter according to a second embodiment of this invention.
Figure 8B:
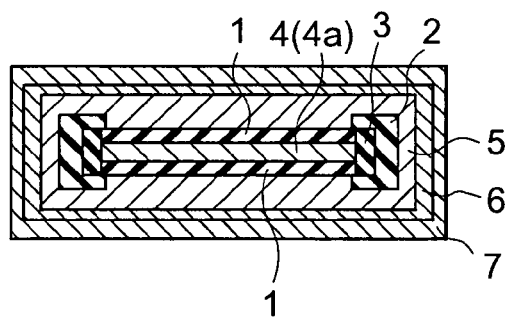
FIG. 8B is a sectional view taken along a line 8B-8B in FIG. 8A.
Figure 8C:
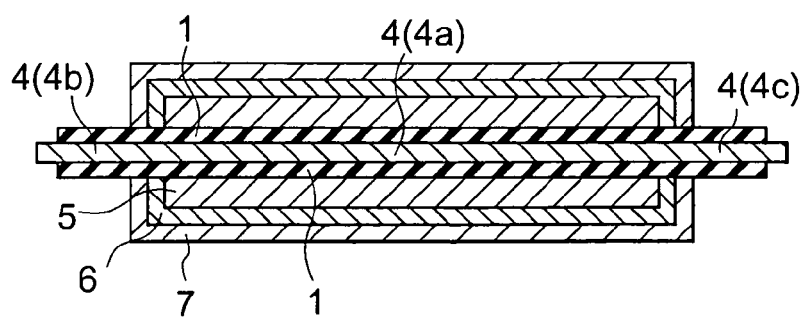
FIG. 8C is a sectional view taken along a line 8C-8C in FIG. 8A.

Referring to FIGS. 8A to 8C, the inner element 200 of the distributed type noise filter has an anode member 4 made of aluminum as the valve action metal. The anode member 4 is provided with a first anode lead portion 4b, an anode portion 4a, and a second anode lead portion 4c in this order. The inner element 200 further has a first dielectric layer 1 made of the oxide of aluminum and formed on lower and upper surfaces of the anode portion 4a, a second dielectric layer 3 made of the oxide of aluminum and formed on left side and right side surfaces as first side and second side surfaces of the anode portion 4a, and a cathode layer formed over the first dielectric layer 1 and the second dielectric layer 3.

The left side and the right side surfaces of the anode portion 4a are opposed to each other and are perpendicular to the lower and the upper surfaces of the anode portion 4a.

The material of the anode member 4 is not limited to aluminum and may be valve action metals such as titanium, tantalum, and niobium, or alloys thereof. The first dielectric layer 1 and the second dielectric layer 3 may be the oxide of valve action metal.

The thickness of the first dielectric layer 1 is 7.8 nm while the thickness of the second dielectric layer 3 is 6.5 nm.

Furthermore, the inner element 200 has an electrical insulating resin layer 2 made of epoxy resin and formed between the second dielectric layer 3 and the cathode layer.

The electrical insulating resin layer 2 is not limited to the epoxy resin and can be electrical insulating resins such as phenol resin, silicon resin, fluorine resin, and polyimide resin. In particular, the epoxy resin is preferable because it is excellent in adhesion.

The thickness of the electrical insulating resin layer 2 is 15 μm. It is preferred that the thickness of the electrical insulating layer 2 is in the range of 2 to 30 μm. This is because layer defect may develop when the thickness is less than 2 μm while volumetric efficiency of the element is reduced when the thickness is more than 30 μm.

The cathode layer is composed of a conductive polymer layer 5 made of conductive polymer, such as polypyrrole and polyaniline, and formed on the first dielectric layer 1, and the electrical insulating resin layer 2, a graphite layer 6 formed on the conductive polymer layer 5, and a silver paste layer 7 formed on the graphite layer 6.

Next, a method of manufacturing the distributed type noise filter according to the second embodiment of this invention will be described.

First, an aluminum foil of a relatively large size and made of aluminum is prepared.

Lower and upper surfaces of the metal foil are enlarged in area by etching. Further, on an outer surface in a predetermined region of the metal foil, a dielectric layer made of oxide of the valve action metal is formed by an anodizing process with an applied voltage of 6V. The metal foil with the dielectric layer is cut into many pieces each of which has a portion without the dielectric layer, another portion with the dielectric layer formed thereon, and the other portion without the dielectric layer in this order. In subsequent manufacturing, each of the pieces is used as the anode member 4 with the first dielectric layer 1 partially formed thereon. The anode member 4 has a rectangular shape and is constituted of the first anode lead portion 4b without the first dielectric layer 1, the anode portion 4a with the first dielectric layer 1, and the second anode lead portion 4b without the first dielectric layer 1 in this order. However, the first dielectric layer 1 is formed on lower and upper surfaces of the anode portion 4a only. On the other hand, the left side and the right side surfaces of the anode portion 4a corresponding to cut surfaces of the anode member 4 (the piece) are uncovered by the first dielectric layer 1 and exposed.

Next, the second dielectric layer 3 is formed on the left side and the right side of the anode portion 4a of the anode member 4 by an anodizing process with an applied voltage of 5V.

Subsequently, an electrical insulating resin layer 2 is formed on a surface of the second dielectric layer 3 by a coating process of epoxy resin with the use of a roll coater.

Then, the conductive polymer layer 5, the graphite layer 6, and the silver paste layer 7 are formed in this order as the cathode layer on the first dielectric layer 1 and the electrical insulating resin layer 2. The conductive polymer layer 5 is formed by a chemical polymerization process.

Thus, the inner element 200 shown in FIGS. 8A to 8C has been manufactured.

Referring again to FIG. 9, the first and the second anode terminals 9 and 11 are respectively connected to a lower surface of the first and the second anode lead portions 4b of the anode member 4 while the cathode terminal 10 is connected to a lower surface of the silver paste layer 7 of the cathode layer.

The inner element 200 is covered with a resin package 8 by molding.

Thus, the distributed constant type noise filter according to the second embodiment of this invention shown in FIG. 9 has been manufactured.

Meanwhile, forming process of the electrical insulating resin layer 2 is not limited to the coating process by the use of the roll coater and may be a coating process by the use of reverse coater, a print process such as screen printing, or a soaking process.

For comparison, the distributed constant type noise filters of the third and the fourth comparative examples have been fabricated and tested.

Third Comparative Example

Figure 3:
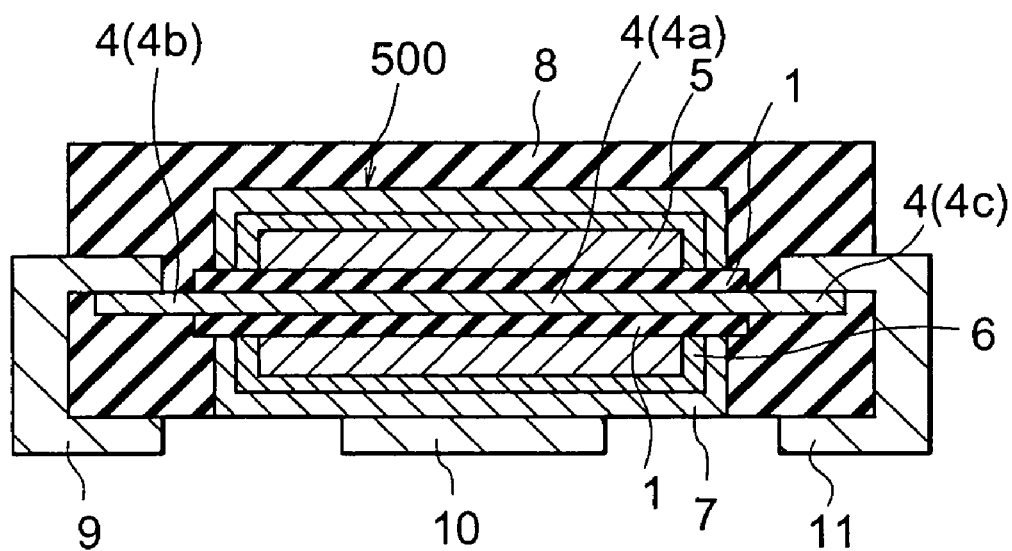
FIG. 3 is a sectional view showing a conventional distributed constant type noise filter as a third comparative example.
Figure 4A:
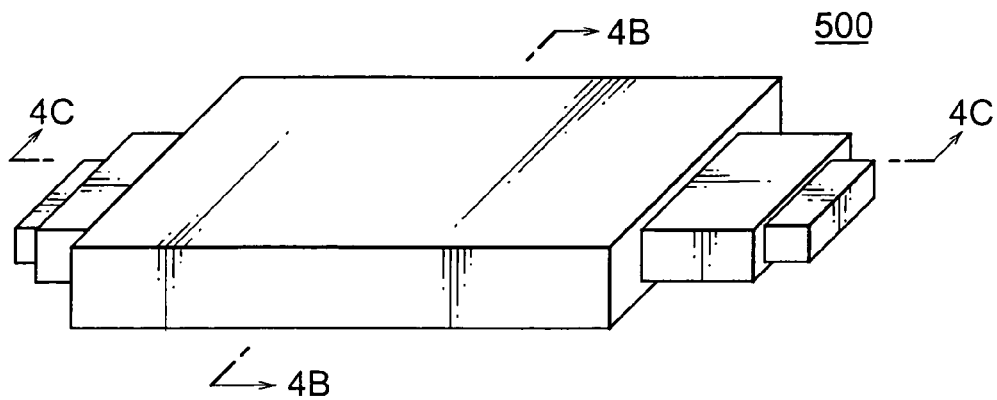
FIG. 4A is a perspective view of an inner element of the filter shown in FIG. 3.
Figure 4B:
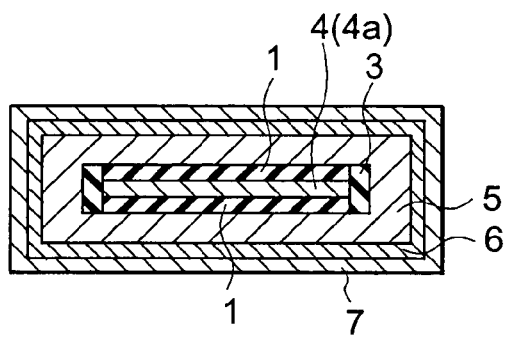
FIG. 4B is a sectional view taken along a line 4B-4B in FIG. 4A.
Figure 4C:
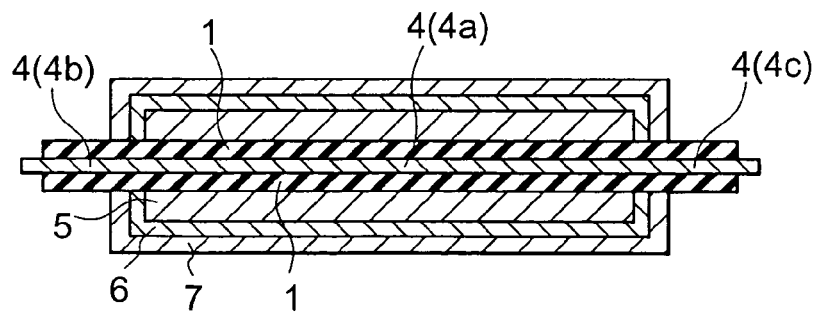
FIG. 4C is a sectional view taken along a line 4C-4C in FIG. 4A.

The conventional distributed type noise filter shown in FIG. 3 is used as the third comparative example. The noise filter has the inner element 500 shown in FIGS. 4A to 4C, the resin package 8, and the first and the second anode terminals 9 and 11 and the cathode terminal 10. The inner element 500 has the anode member 4 made of aluminum as the valve action metal, the first dielectric layer 1 made of the oxide of aluminum, the second dielectric layer 3 made of the oxide of aluminum, and the cathode layer composed of the conductive polymer layer 5, the graphite layer 6, and the silver paste layer 7.

The thickness of the first dielectric layer 1 is 7.8 nm while the thickness of the second dielectric layer 3 is 6.5 nm.

In the distributed type noise filter (the element 500) of the third comparative example, only the second dielectric layer 3 with a thickness of 6.5 nm is formed on the left side and the right side surfaces of the anode portion 4a. The second dielectric layer 3 is formed by the anodizing process with an applied voltage of 5V.

Fourth Comparative Example

Figure 10A:
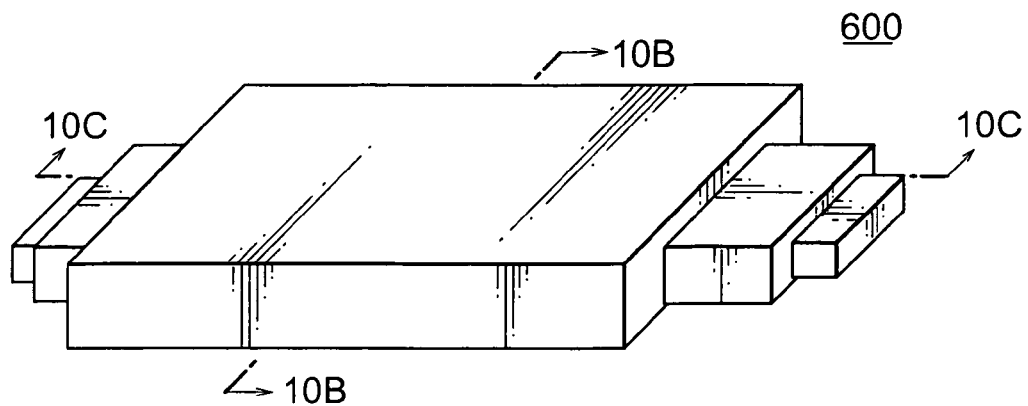
FIG. 10A is a perspective view showing an inner element of a distributed constant type noise filter as a fourth comparative example.
Figure 10B:
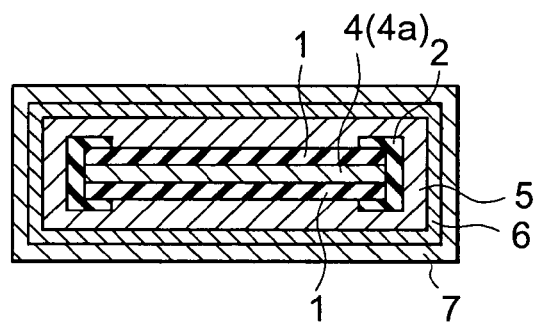
FIG. 10B is a sectional view taken along a line 10B-10B in FIG. 10A.
Figure 10C:
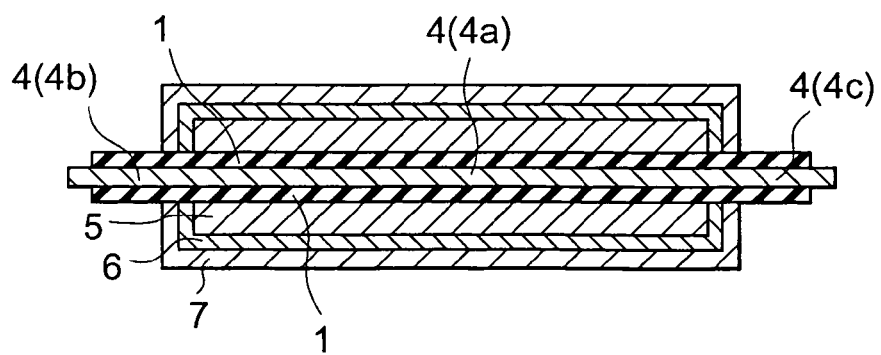
FIG. 10C is a sectional view taken along a line 10C-10C in FIG. 10A.

The distributed type noise filter of a fourth comparative example has the inner element 600 shown in FIGS. 10A to 10C, a resin package, and first and anode terminals, and cathode terminals. Referring to FIGS. 10A to 10C, the inner element 600 has an anode member 4 made of aluminum as the valve action metal, a first dielectric layer 1 made of the oxide of aluminum, an electrical insulating resin layer 2 made of epoxy resin, and a cathode layer composed of a conductive polymer layer 5, a graphite layer 6, and a silver paste layer 7.

The thickness of the first dielectric layer 1 is 7.8 nm while the thickness of the electrical insulating resin layer 2 is 15 μm.

In the distributed type noise filter (the element 600) of the fourth comparative example, only the electrical insulating resin layer 2 is formed on the left side and the right side surfaces of the anode portion 4a.

Now, the distributed type noise filters of the second embodiment and the third and the fourth comparative examples have been tested with leak current.

As test pieces, 100 pieces of the distributed type noise filters in connection with the second embodiment and the third and the fourth comparative examples are prepared.

Test conditions are as follows. A voltage of 2.5 V is applied for 60 seconds between the first and second anode terminals with the cathode terminal of each of the test pieces. A test piece is defined as defective when it shows a leak current of 15 μA or more.

As the test result, the distribution in leak current, the average leak current, and the defective rate in connection with each of the second embodiment and the third and the fourth comparative examples are shown in Table 1 mentioned above.

Referring to Table 1, it is clear that the second embodiment is improved in the defective rate compared to both of the third comparative example and the fourth comparative example. This result came from the fact that the second embodiment has the insulating resin layer on the second dielectric layer while the third comparative example has no electrical insulating resin layer and the fourth comparative example has no second dielectric layer. Meanwhile, the fourth comparative example is superior in the defective rate to the third comparative example although it is less improved compared with the second embodiment.

While this invention has thus far been described in connection with the preferred embodiments thereof, it will be readily possible for those skilled in the art to put this invention into practice in various other manners without departing from the scope set forth in the appended claims.

What is claimed is:

1. A solid electrolytic capacitor comprising:
an anode member which is made of a valve action metal, said anode member being provided with an anode portion and an anode lead portion;
a first dielectric layer made of an oxide of the valve action metal and formed on lower and upper surfaces of said anode portion;
a second dielectric layer made of an oxide of the valve action metal and formed on first side, second side, and third side surfaces of said anode portion, said first side and said second side surfaces being opposed to each other and perpendicular to said lower and said upper surfaces of said anode portion, said third side surface being perpendicular to said lower and said upper surfaces of said anode portion and positioned to make an angle with said first side and said second side surfaces;
an electrical insulating resin layer formed on said second dielectric layer; and
a cathode layer formed on said first dielectric layer and said electrical insulating resin layer.

2. The solid electrolytic capacitor according to claim 1, wherein said electrical insulating resin layer is made of one of epoxy resin, phenol resin, silicon resin, fluorine resin, and polyimide resin.

3. The solid electrolytic capacitor according to claim 1, wherein said electrical insulating resin layer has a thickness in the range of 2 to 30 μm.

4. The solid electrolytic capacitor according to claim 1, wherein the valve action metal is aluminum, titanium, tantalum, niobium, or alloys thereof.

5. The solid electrolytic capacitor according to claim 1, wherein said cathode layer is composed of a conductive polymer layer formed on said first dielectric layer and said electrical insulating resin layer, a graphite layer formed on said conductive polymer layer, and a silver paste layer formed on said graphite layer.

6. The distributed constant type noise filter comprising:
an anode member which is made of a valve action metal, said anode member being provided with a first anode lead portion, an anode portion, and a second anode lead portion;
a first dielectric layer made of an oxide of the valve action metal and formed on lower and upper surfaces of said anode portion;
a second dielectric layer made of an oxide of the valve action metal and formed on first side and second side surfaces of said anode portion, said first side and said second side surfaces being opposed to each other and perpendicular to said lower and said upper surfaces of said anode portion;
an electrical insulating resin layer formed on said second dielectric layer; and
a cathode layer formed on said first dielectric layer and said electrical insulating resin layer.

7. The distributed constant type noise filter according to claim 6, wherein said electrical insulating resin layer is made of one of epoxy resin, phenol resin, silicon resin, fluorine resin, and polyimide resin.

8. The distributed constant type noise filter according to claim 6, wherein said electrical insulating resin layer has a thickness in the range of 2 to 30 μm.

9. The A distributed constant type noise filter according to claim 6, wherein the valve action metal is aluminum, titanium, tantalum, niobium, or alloys thereof.

10. The A distributed constant type noise filter according to claim 6, wherein said cathode layer is composed of a conductive polymer layer formed on said first dielectric layer and said electrical insulating resin layer, a graphite layer formed on said conductive polymer layer, and a silver paste layer formed on said graphite layer.

11. A method of manufacturing a solid electrolytic capacitor, the method comprising the steps of:
preparing a metal foil made of a valve action metal, said metal foil having a dielectric layer made of an oxide of the valve action metal on lower and upper surface thereof;
cutting-into an anode member from said metal foil, said anode member being provided with an anode portion and an anode lead portion, lower and upper surface of said anode portion being covered by a first dielectric layer served by said dielectric layer while first side, second side, and third side surfaces of said anode portion corresponding to cut surfaces of said metal foil being exposed, said first side and said second side surfaces being opposed to each other and perpendicular to said lower and said upper surfaces of said anode portion, said third side surface being perpendicular to said lower and said upper surfaces of said anode portion and positioned to make an angle with said first side and said second side surfaces;
forming a second dielectric layer made of an oxide of the valve action metal on said first side, said second side, and said third side surfaces of said anode portion;
forming an electrical insulating resin layer on said second dielectric layer; and
forming a cathode layer on said first dielectric layer and said electrical insulating resin layer.

12. The method of manufacturing a solid electrolytic capacitor according to claim 11, wherein said electrical insulating resin layer is made of one of epoxy resin, phenol resin, silicon resin, fluorine resin, and polyimide resin.

13. The method of manufacturing a solid electrolytic capacitor according to claim 11, wherein said electrical insulating resin layer is formed by one of a coating process of insulating resin, a print process of insulating resin, and a soaking process of insulating resin.

14. The method of manufacturing a solid electrolytic capacitor according to claim 11, wherein said first dielectric layer and said second dielectric layer are respectively formed by an anodizing process with voltage applied.

15. The method of manufacturing a solid electrolytic capacitor according to claim 11, wherein the cathode layer-forming step includes the steps of forming a conductive polymer layer on said first dielectric layer and said electrical insulating resin layer, forming a graphite layer on said conductive polymer layer, and forming a silver paste layer on said graphite layer.

16. The method of manufacturing a distributed constant type noise filter, the method comprising the steps of:
preparing a metal foil made of a valve action metal, said metal foil having a dielectric layer made of an oxide of the valve action metal on lower and upper surface thereof;
cutting-into an anode member from said metal foil, said anode member being provided with a first anode lead portion, an anode portion, and a second anode lead portion, lower and upper surface of said anode portion being covered by a first dielectric layer served by said dielectric layer while first side and second side surfaces of said anode portion corresponding to cut surfaces of said metal foil being exposed, said first side and said second side surfaces being opposed to each other and perpendicular to said lower and said upper surfaces of said anode portion;

forming a second dielectric layer made of an oxide of the valve action metal on said first side and second side surfaces of said anode portion;

forming an electrical insulating resin layer on said second dielectric layer; and forming a cathode layer on said first dielectric layer and said electrical insulating resin layer.

17. The method of manufacturing a distributed constant type noise filter according to claim 16, wherein said electrical insulating resin layer is made of one of epoxy resin, phenol resin, silicon resin, fluorine resin, and polyimide resin.

18. The method of manufacturing a distributed constant type noise filter according to claim 16, wherein said electrical insulating resin layer is formed by one of a coating process of insulating resin, a print process of insulating resin, and a soaking process of insulating resin.

19. The method of manufacturing a distributed constant type noise filter according to claim 16, wherein said first dielectric layer and said second dielectric layer are respectively formed by an anodizing process with voltage applied.

20. The method of manufacturing a distributed constant type noise filter according to claim 16, wherein the cathode layer-forming step includes the steps of forming a conductive polymer layer on said first dielectric layer and said electrical insulating resin layer, forming a graphite layer on said conductive polymer layer, and forming a silver paste layer on said graphite layer.

* * * * *